(12) United States Patent
Teodor et al.

(10) Patent No.: US 12,063,300 B2
(45) Date of Patent: Aug. 13, 2024

(54) COMPUTER IMPLEMENTED METHODS, APPARATUSES AND SOFTWARE FOR RANDOM NUMBER GENERATION BASED ON GENETIC INFORMATION

(71) Applicant: VEIOVIA Ltd., York (GB)

(72) Inventors: Roxana Iuliana Teodor, York (GB); Peter Damian Ashton, York (GB); Remy Lyon, York (GB); Siamak Fayyaz Shahandashti, York (GB); Katherine Newling, York (GB)

(73) Assignee: Veiovia Ltd. (GB)

( * ) Notice: Subject to any disclaimer, the term of this patent is extended or adjusted under 35 U.S.C. 154(b) by 204 days.

(21) Appl. No.: 17/863,181

(22) Filed: Jul. 12, 2022

(65) Prior Publication Data
US 2024/0022400 A1   Jan. 18, 2024

(51) Int. Cl.
H04L 29/06   (2006.01)
G06F 21/00   (2013.01)
H04L 9/06   (2006.01)
H04L 9/08   (2006.01)

(52) U.S. Cl.
CPC .............. H04L 9/0866 (2013.01); H04L 9/06 (2013.01); H04L 9/0869 (2013.01)

(58) Field of Classification Search
None
See application file for complete search history.

(56) References Cited

U.S. PATENT DOCUMENTS

| | | | |
|---|---|---|---|
| 7,519,178 B1* | 4/2009 | Matyas, Jr. | H04L 9/302 713/168 |
| 10,312,091 B1* | 6/2019 | Smayling | G09C 1/00 |
| 2004/0230990 A1* | 11/2004 | Ikegami | H04N 21/41265 725/31 |
| 2005/0180569 A1* | 8/2005 | Kevenaar | G06T 1/005 380/213 |

(Continued)

OTHER PUBLICATIONS

Combined Search and Examination Report under Sections 17 and 18(3), Application No. GB2210255.2 dated Mar. 3, 2023, 11 pages.

(Continued)

*Primary Examiner* — Lisa C Lewis
(74) *Attorney, Agent, or Firm* — Baker Botts L.L.P.

(57) ABSTRACT

The disclosure provides computer-implemented methods, computing apparatuses and computer program products for generating a random number based on genetic information from a biological data source containing at least the genetic information sequenced from a biological organism. In response to receiving a request for a random number at the computing device, a seed value is obtained from an entropy source accessible by the computing device and used to initialize a pseudo random number generator. A sequence of values derived from genetic information for a biological organism is retrieved from a biological data source from which values are read in selected positions in the sequence of values derived from genetic information. The values are encoded to pairs of bits using an encoding scheme and assembled to provide a bit string as a random number. At least one of the selections is based on the pseudo random output.

20 Claims, 11 Drawing Sheets

Specification includes a Sequence Listing.

(56) References Cited

U.S. PATENT DOCUMENTS

| | | | | |
|---|---|---|---|---|
| 2008/0263117 | A1* | 10/2008 | Rose | H04L 9/0869 |
| | | | | 713/1 |
| 2010/0107229 | A1* | 4/2010 | Najafi | H04W 12/069 |
| | | | | 709/248 |
| 2012/0255030 | A1* | 10/2012 | Matsuo | H04L 9/085 |
| | | | | 726/26 |
| 2014/0304810 | A1* | 10/2014 | Khanal | H04L 63/1466 |
| | | | | 726/22 |
| 2018/0124600 | A1* | 5/2018 | Chen | H04L 9/3234 |
| 2020/0387591 | A1* | 12/2020 | Witchey | G06F 21/33 |
| 2021/0273797 | A1* | 9/2021 | Dewitt | G06F 21/604 |
| 2022/0045851 | A1* | 2/2022 | Krishnamoorthy | H04L 9/008 |
| 2022/0150051 | A1* | 5/2022 | Mandich | H04L 9/0662 |
| 2022/0255909 | A1* | 8/2022 | Pan | H04L 63/0435 |
| 2022/0327209 | A1* | 10/2022 | Schat | G06F 21/554 |

OTHER PUBLICATIONS

SAT 2015, 18th International Conference, Lecture Notes in Computer Science, 2016, Balanici et al., "Full Duplex OTP Cryptosystem Based on DNA Key for Text Transmissions", pp. 39-48.

2008 International Conference on Computational Intelligence and Security, 2008, Li et al., "A Novel Generation Key Scheme Based on DNA", pp. 264-266.

Biosystems, vol. 100, 2010, Gearheart et al., "DNA-based random number generation in security circuitry", pp. 208-214.

\* cited by examiner

302

@5d08ebdf-4b02-45bf-ac72-8e5716ca468d
runid=3b55a2b916b3c56c641a45f4898b156692a08534
sampleid=Strawb_leaf
read=1440
ch=2028
start_time=2018-08-30T15:49:09Z
AT CA TT AC TT CG TT CG AA CC GT AT TG CT CT TG
AT TT TC CT AC TT TG TT TA CT AG TT TT AG AC TT
GA TT TT AT AT TG TG TA GT TG CT TT AA CT TA GT
TT TA TT TC AT TA TA AA CT GG TT TT AT AA CA TT
TG AT AA TA GA TT AC GC TT TG AG GT TT TT AT GG
CT AG AG GC GT GC CT TA AG CA CT CT CA GG CG GC
GC CT GG GC TC AG GG TC GC CC TG GC CT AG GT GC
GC CT AG GG CC TT TT AA TC AT AA TG AG TA TT TT
.. .. .. .. .. .. .. .. .. .. .. .. .. .. .. ..
.. .. .. .. .. .. .. .. .. .. .. .. .. .. .. ..
AT AG AA TA AG AT TA TT CT TT CA AG GC AA TT CC

```
import random
import time                                                              600 time_ns = time.perf_counter_ns()
print("Seed (performance counter) =", time_ns)
max_base_number = 127 random.seed(time_ns)
print("Base selection 1 = ", int(random.uniform(0, max_base_number)))
print("Base selection 2 = ", int(random.uniform(0, max_base_number)))
print("Base selection 3 = ", int(random.uniform(0, max_base_number)))
print("Base selection 4 = ", int(random.uniform(0, max_base_number)))
print("Base selection 5 = ", int(random.uniform(0, max_base_number)))
print("Base selection 6 = ", int(random.uniform(0, max_base_number)))
print("Base selection 7 = ", int(random.uniform(0, max_base_number)))
print("Base selection 8 = ", int(random.uniform(0, max_base_number)))
print("Base selection 9 = ", int(random.uniform(0, max_base_number)))
print("Base selection 10 = ", int(random.uniform(0, max_base_number)))
print("Base selection 11 = ", int(random.uniform(0, max_base_number)))
print("Base selection 12 = ", int(random.uniform(0, max_base_number)))
print("Base selection 13 = ", int(random.uniform(0, max_base_number)))
print("Base selection 14 = ", int(random.uniform(0, max_base_number)))
print("Base selection 15 = ", int(random.uniform(0, max_base_number)))
print("Base selection 16 = ", int(random.uniform(0, max_base_number)))
print("Coding scheme selection = ", int(random.uniform(0, 24)))
```

FIG. 6A

```
Seed (performance counter) = 32888750
Base selection 1  =  18
Base selection 2  =  41
Base selection 3  =  3
Base selection 4  =  25
Base selection 5  =  32
Base selection 6  =  30
Base selection 7  =  48
Base selection 8  =  103           602
Base selection 9  =  13
Base selection 10 =  89
Base selection 11 =  4
Base selection 12 =  99
Base selection 13 =  33
Base selection 14 =  32
Base selection 15 =  55
Base selection 16 =  45
Coding scheme selection =  11
```

| # | 00 | 01 | 10 | 11 |
|---|----|----|----|-----|
| 0 | A | C | G | T |
| 1 | C | A | G | T |
| 2 | G | A | C | T |
| 3 | A | G | C | T |
| 4 | C | G | A | T |
| 5 | G | C | A | T |
| 6 | G | C | T | A |
| 7 | C | G | T | A |
| 8 | T | G | C | A |
| 9 | G | T | C | A |
| 10 | C | T | G | A |
| 11 | T | C | G | A |
| 12 | T | A | G | C |
| 13 | A | T | G | C |
| 14 | G | T | A | C |
| 15 | T | G | A | C |

FIG. 8

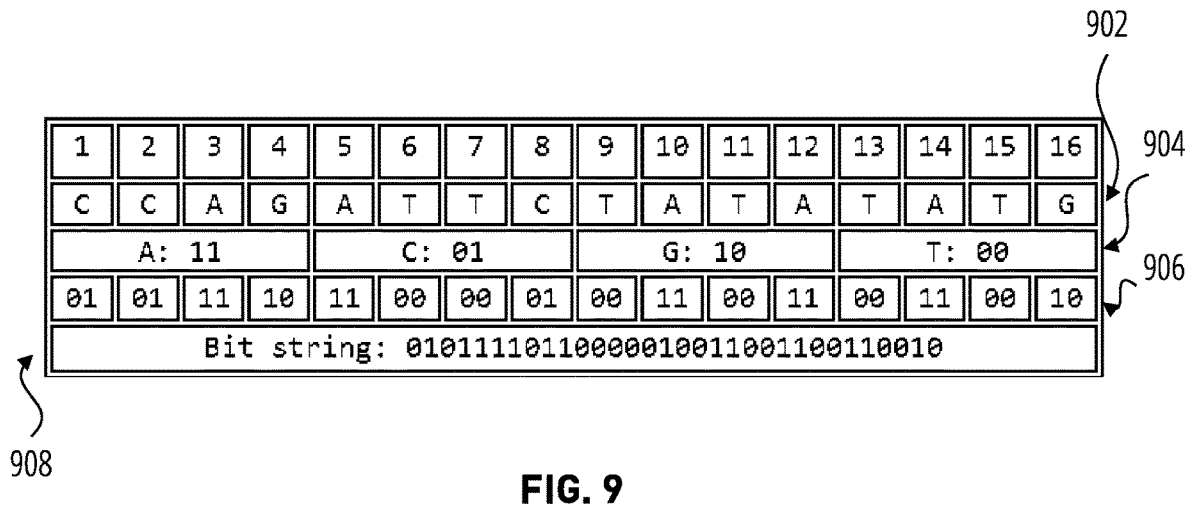

FIG. 9

```
@5d08ebdf-4b02-45bf-ac72-8e5716ca468d

Seed (performance counter) = 32888750
Base selection 1  =   18
Base selection 2  =   41
Base selection 3  =   3
Base selection 4  =   25
Base selection 5  =   32
Base selection 6  =   30
Base selection 7  =   48
Base selection 8  =   103
Base selection 9  =   13
Base selection 10 =   89
Base selection 11 =   4
Base selection 12 =   99
Base selection 13 =   33
Base selection 14 =   32
Base selection 15 =   55
Base selection 16 =   45
Coding scheme selection =  11

Random Number: 01011110110000010011001100110010
```

FIG. 10

```
import hashlib
m = hashlib.sha256()
m.update("01011110110000010011001100110010".encode('utf-8'))
m.update("32888750".encode('utf-8 ))
print("Hashed random number = ", m.hexdigest())
```
1100

FIG. 11A

```
05d08ebdf-4b02-45bf-ac72-8e5716ca468d
Seed (performance counter) = 32888750
Hashed random number =
2809d5d03d1ff393ef3851182d9e4fe93017c6242327d3682ee48888b4aca7c9
```
1102

FIG. 11B

COMPUTER IMPLEMENTED METHODS, APPARATUSES AND SOFTWARE FOR RANDOM NUMBER GENERATION BASED ON GENETIC INFORMATION

TECHNICAL FIELD

The present disclosure relates to generating random numbers. In particular, the disclosure provides methods, apparatuses and computer program products for random number generation based on genetic information.

SEQUENCE LISTING

The contents of the electronic sequence listing (P341560US ST26.xml; Size: 6,208 bytes; and Date of Creation: Dec. 8, 2022) is herein incorporated by reference in its entirety.

BACKGROUND

Random numbers are required in large volumes to serve a wide range of technical applications ranging from gaming and gambling, statistical modelling through to cryptography such as in the generation of cryptographic keys to provide security in the financial and communications sectors, among others. There is significant demand for Random Number Generators to be made available as sources of random numbers to be used in these applications.

Each application generally requires the numbers provided by Random Number Generators to be truly random, that is one that provides random numbers that are completely unpredictable in foresight, no better than random chance. The random numbers generated may also need to conform to a specific distribution and coverage (usually uniformly covering a specified number space).

Generally, the use of Pseudo Random Number Generators may be insufficient for these applications as they do not provide truly unpredictable outputs.

In order to produce numbers that conform to these requirements, Random Number Generators use a core source of 'true' randomness, usually a physical source of statistically random and unpredictable noise (such as hardware noise, thermal noise, using quantum phenomena). Signals from these noise sources may then be processed and additional entropy may be added, in order to generate a random number that meets the requirements of a certain application.

Generally these hardware Random Number Generators need to be carefully calibrated and operated in a controlled environment, otherwise they could be subjected to external influence and characteristic behaviours which could render their output less unpredictable and as such not truly random. As such, the provision of random numbers using these Random Number Generators is not straightforward and so their ability to meet the increasing demand for truly random numbers in a rapidly expanding internet, with increasing applications, is unclear.

Further, after the random number is generated, these hardware Random Number Generators do not track the core noise source. As a result the process of how the original data gave rise to the random number is not auditable or validatable, and so the receiver of the random number may not be able to verify that the number has been generated by a true noise source, which may erode trust in the source of random numbers, and raises security concerns in the systems that rely on these Random Number Generators as a source of randomness.

It is in the above context that the present disclosure has been devised.

SUMMARY OF THE DISCLOSURE

Viewed from one aspect, the present disclosure provides a computer-implemented method of generating a random number based on genetic information from a biological data source containing at least the genetic information sequenced from a biological organism, the method comprising, by a computing apparatus: in response to receiving a request for a random number at the computing device, obtaining a seed value from an entropy source accessible by the computing device; initialising a pseudo random number generator using the seed to determine a pseudo random output; retrieving, from a biological data source accessible by the computing device, a sequence of values derived from genetic information for a biological organism; selecting positions in the sequence of values derived from genetic information; reading the values in the selected positions in the sequence of values derived from genetic information; encoding the values to pairs of bits using an encoding scheme; and assembling the pairs of bits to provide a bit string as a random number; wherein at least one of the selecting of the positions in the sequence of values derived from genetic information and the selection of the encoding scheme is based on the pseudo random output.

It has been found that, by processing sequences of values derived from genetic information, such as nucleobases obtained by sequencing a deoxyribonucleic acid, DNA, sequence or a ribonucleic acid, RNA, sequence obtained from a biological organism using a genetic sequencer, in accordance with the methods described herein, unpredictable and truly random numbers can be generated, exploiting the randomness seen in DNA and RNA sequences. In particular, the use of the output of a pseudo Random Number Generator seeded with a seed value obtained in response to receiving a request for a random number, which takes a value uncontrollable in advance, to select a set of randomised positions in the sequence of values derived from genetic information, which itself represents a physical source of inherently random and unpredictable values, combine to generate an unpredictable and truly random number output.

The methods have been demonstrated to pass a large number of Random Number Test Suites, including the NIST SP800-22 Test Suite, the Dieharder Test Suite, the TestU01 Small Crush Test Suite, the TestU01 Alphabit Test Suite, and the TestU01 Rabbit Test Suite. Given the volume of genetic information available from genetic sequencers, with the advent of third generation sequencing technologies enabling the rise in full genome sequencing that will deliver personalised medicine, the methods described herein can provide as a byproduct a potentially limitless source of true random numbers that are easy to produce and maintain, without requiring careful hardware validation or a controlled environment to maintain statistical unpredictability.

Further, as the genetic information used to generate the random numbers is easily retained, after the generation of each random number, the process of generating that random number can be audited and verified by a process in which the random number can be recreated by processing the genetic information in the same way to recreate the original random number. In this way, although the random number that is produced by the methods described herein is unpredictable in advance, after it has been generated it can be easily verified that it has indeed been generated by the method described in this application. This can increase the security and integrity of the systems that rely on the method for producing random numbers for cryptographic purposes.

Further still, as the genetic information used to generate the random numbers is generated at speed by a genetic sequencer or by post processing to generate the reads, and can be retained in volume in a biological data store, the methods described herein can be used to quickly generate truly random numbers in large volumes of arbitrary sizes.

Further, although the genetic information produced from a biological organism may need to be handled secretly (and indeed, keeping the genetic information secret at least in advance of the generation of the random number can further enhance its unpredictability), it can be used both as a source of physical randomness for use in producing truly random numbers, and for securely verifying the generation of the random numbers afterwards, without needing to compromise the secret nature of the genetic information.

Thus, appropriately processed, genetic information can provide an effectively limitless verifiable source of easily produced, reliably truly random numbers. Further, the use of genetic information as a physical source of randomness provides a further valuable technical use of this information, with the methods described herein allowing that value to be controlled and its use technically exploited for cryptographic purposes, the sharing of which can further incentivize the provision of biological organism samples for sequencing, accelerating the development and deployment of personalised medicines and other scientific and therapeutic benefits delivered by capturing genetic information.

In embodiments, the method may further comprise sending the random number responsive to the received request.

In embodiments, the method may further comprise hashing the random number with one or more of: the original seed value used to seed the pseudo random number generator; a further seed value obtained from the entropy source accessible by the computing device; an identifier of the request for a random number at the computing device; a user-supplied source of entropy; a hash of the request for a random number at the computing device; the method further comprising sending the hash responsive to the received request. The hashing of the truly random numbers together with some of the information used in the generation of that random number allows the generated hash to also be truly random and unpredictable, while also hiding the original random number produced from the genetic information. This can further help retain the secret nature of the genetic information selected from to produce the random number, and it can also be useful in verifying the random number after it has been produced, building further evidence that the random number has been generated using the method.

In embodiments, the entropy source accessible by the computing device may be the time of the computing device measured using a system clock of the computing device. In embodiments, the system clock may provide the time to a sub-microsecond resolution. In other embodiments, the system clock may provide the time to a nanosecond resolution. The seeding of the pseudo Random Number Generator with a time of a system clock of a computing apparatus, to such a high resolution, allows the pseudo random output used for selecting values from the sequence of values derived from genetic information to be unpredictable in advance of the request for a random number being received. In this way, the unpredictable and random selection of values from the unpredictable and random genetic information ensures that the generated random number is truly random and unpredictable in advance of the number being generated.

In embodiments, retrieving, from a biological data source accessible by the computing device, a sequence of genetic information for the biological organism may comprise selecting the sequence of genetic information at random from a plurality of available sequences of genetic information retrieved from the biological data source. In this way, random selection from the available sequences of genetic information at the time of generating the random number further enhances the unpredictability of the random number generated by selecting values from random positions in the randomly selected sequence.

In embodiments, after retrieving the sequence of genetic information from the biological data source and using the sequence in generating a random number, the sequence of genetic information may be not used again to generate another, different random number. By using each sequence only once, and avoiding their re-use, the unpredictability of the random number generated by the method is further enhanced. This may be achieved by a simple flag being marked in a field in the biological data source indicating that a particular sequence has already been used to generate a random number, with the method including selecting the sequence only from among those that have not already been used to generate a random number.

In embodiments, the sequence of values derived from genetic information for a biological organism may comprise sequenced bases of genetic information obtained from a sequencing device. The read values may be bases read from selected base positions in the sequence of genetic information, the encoding scheme coding bases to bit pairs. In this way, the output of, for example, a third generation genetic sequencer, processed by a "base calling" method to sequence nucleobases in the DNA or RNA in the sample from the biological organism, can be used to generate truly random numbers. The sequences used for generating the random numbers may be retrieved from a store, or they may be used as they are generated in real time by a genetic sequencer or output by a subsequent "base calling" process.

As there are four identifiable nucleobases (adenine ("A"), cytosine ("C"), guanine ("G") and thymine("T")), each nucleobase can be mapped to one of four different bit pairs using a suitable encoding scheme (for example, A: 00, C: 01, G: 10, and T: 11), with 24 different encoding schemes being possible due to the number of permutations of mapping the four nucleobases to the four bit pairs. In embodiments, encoding the bases to pairs of bits using an encoding scheme may comprise randomly selecting the encoding scheme from an available set of encoding schemes mapping bases to pairs of bits. In embodiments, the random selection may be based on an output of the pseudo random number generator. Randomly selecting the encoding scheme from a number of the available encoding schemes, based on the pseudo random output, can provide an alternative, or a further mechanism for rendering the random number generated to be unpredictable.

In embodiments, the method may further comprise storing at least one of the following items of information used to generate the random number, for later use in verifying the generation of the random number: the original seed value used to seed the pseudo random number generator in the generation of the random number; the sequence of genetic information used to generate the random number; an indication of the encoding scheme used to generate the random number; the random number; optionally, any additional information hashed together with the random number; the storing enabling later validation of the random number and the method used to generate the random number. The information may be stored in a data store accessible to the computing apparatus used to generate the random number, and also a user computing apparatus that receives the generated random number and wishes to validate it. At least some of the above items of information may also be sent to the receiver of the random number (or a random hash produced therefrom), to allow the user computing apparatus to use some of that information to validate the random number as having been generated by the truly random number generation process.

In embodiments, the method may further comprise: receiving a request to validate the generation of the random number, the request indicating at least the random number to be validated; responsive to the request, retrieving the information used to generate the random number; reinitialising the pseudo random number generator with the original seed value to generate a pseudo random output; selecting, based on the pseudo random output, positions in the sequence of values derived from genetic information used to generate the random number; reading the values in selected positions in the sequence of values derived from genetic information used to generate the random number; encoding the values to pairs of bits using an encoding scheme used to generate the random number to generate a recreated random number; validating the random number based on the recreated random number and the request to validate the generation of the random number. In this way, the random number may be validated to have been generated using a method that provides truly random numbers that are unpredictable at the time of their generation. This may be achieved by using a stored seed for the pseudo Random Number Generator and the sequence of values derived from genetic information used to generate the random number, and the random number may be recreated. Alternatively, rather than re-seeding the pseudo Random Number Generator with the original seed, the positions from which values were selected from the sequence of values derived from genetic information may be stored and used to recreate the random number. The validation process itself may be performed by the same computing system as generating the random number, or any computing system having access to the information used to generate the random number, as required, and the same pseudo Random Number Generator, if needed.

In embodiments, the combination of the obtaining of a seed value from an entropy source accessible by the computing device, in response to receiving a request for a random number, and the selecting of random positions from a new and previously unused sequence of values derived from genetic information randomly selected from the biological data source ensures that the random number cannot be known or predicted in advance of the request for a random number being received.

In embodiments, the sequence of values derived from genetic information may be kept secret and not revealed to the requester of the random number or a requestor to validate the generation of the random number. In this way, although the genetic information used to generate the random number may be kept secret in order to maintain privacy, it can still be used to generate a truly random number, and to validate the generation of the truly random number.

In embodiments, the biological data source may comprise a store of biological data stored in a memory of one or more servers, or wherein the biological data source comprises a stream of biological data generated by a genetic sequencer as it is processing genetic information sequenced from a biological organism. Thus the random numbers may be generated "live" in the sequencing workflow, or by processing previously sequenced genetic information stored in a data store (e.g. a server).

Viewed from one aspect, the present disclosure provides a computing apparatus comprising: one or more processors; and a memory storing instructions that, when executed by one or more of the processors, configure the apparatus to: in response to receiving a request for a random number at the computing apparatus, obtain a seed value from an entropy source accessible by the computing apparatus; initialize a pseudo random number generator using the seed to determine a pseudo random output; retrieve, from a biological data source accessible by the computing apparatus, a sequence of values derived from genetic information for a biological organism; select positions in the sequence of values derived from genetic information; read the values in the selected positions in the sequence of values derived from genetic information; encode the values to pairs of bits using an encoding scheme; and assemble the pairs of bits to provide a bit string as a random number; wherein the computing apparatus is further configured by the instructions to select, based on the pseudo random output, at least one of: the positions in the sequence of values derived from genetic information; the encoding scheme.

Viewed from one aspect, the present disclosure provides a non-transitory computer-readable storage medium, the computer-readable storage medium including instructions that when executed by one or more processors of a computing apparatus, cause one or more of the processors to: in response to receiving a request for a random number at the computing device, obtain a seed value from an entropy source accessible by the computing device; initialize a pseudo random number generator using the seed to determine a pseudo random output; retrieve, from a biological data source accessible by the computing device, a sequence of values derived from genetic information for a biological organism; select positions in the sequence of values derived from genetic information; read the values in the selected positions in the sequence of values derived from genetic information; encode the values to pairs of bits using an encoding scheme; and assemble the pairs of bits to provide a bit string as a random number; wherein the instructions further configure one or more of the processors to select, based on the pseudo random output, at least one of: the positions in the sequence of values derived from genetic information; the encoding scheme.

Viewed from one aspect, the present disclosure provides a computer-implemented method for validating a random number generated by the methods described herein, comprising, by a computing apparatus: receiving a request to validate the generation of the random number, the request indicating at least the random number to be validated; responsive to the request, retrieving the information used to generate the random number, including retrieving, from a biological data source accessible by the computing device, a sequence of values derived from genetic information for a biological organism; obtaining the selected positions in the sequence of values derived from genetic information used to generate the random number; obtaining the encoding scheme used to generate the random number; reading the values in selected positions in the sequence of values derived from genetic information used to generate the random number; encoding the values to pairs of bits using the encoding scheme used to generate the random number to generate a recreated random number; using information based at least on the recreated random number to validate the random number.

In embodiments, retrieving the information used to generate the random number may comprise at least one of: retrieving at least some of the information from a data store at a location accessible by the computing apparatus, the information having been stored at the location responsive to the generation of the random number; retrieving at least some of the information from the received request to validate the generation of the random number.

In embodiments, obtaining the selected positions in the sequence of values derived from genetic information used to generate the random number may comprise: reinitialising the pseudo random number generator with the original seed value to generate a pseudo random output; and selecting, based on the pseudo random output, positions in the sequence of values derived from genetic information used to generate the random number.

In embodiments, obtaining the encoding scheme used to generate the random number may comprise: reinitialising the pseudo random number generator with the original seed value to generate a pseudo random output; selecting, based on the pseudo random output, the encoding scheme used to generate the random number.

Viewed from one aspect, the present disclosure provides a computing apparatus comprising for validating a random number generated by these method described herein, comprising: one or more processors; and a memory storing instructions that, when executed by one or more of the processors, configure the apparatus to: receive a request to validate the generation of the random number, the request indicating at least the random number to be validated; responsive to the request, retrieve the information used to generate the random number, including retrieving, from a biological data source accessible by the computing device, a sequence of values derived from genetic information for a biological organism; obtain the selected positions in the sequence of values derived from genetic information used to generate the random number; obtain the encoding scheme used to generate the random number; read the values in selected positions in the sequence of values derived from genetic information used to generate the random number; encode the values to pairs of bits using the encoding scheme used to generate the random number to generate a recreated random number; and use information based at least on the recreated random number to validate the random number.

Viewed from one aspect, the present disclosure provides a non-transitory computer-readable storage medium, the computer-readable storage medium including instructions for validating a random number generated by the methods described herein, that when executed by one or more processors of a computing apparatus, cause one or more of the processors to: receive a request to validate the generation of the random number, the request indicating at least the random number to be validated; responsive to the request, retrieve the information used to generate the random number, including retrieving, from a biological data source accessible by the computing device, a sequence of values derived from genetic information for a biological organism; obtain the selected positions in the sequence of values derived from genetic information used to generate the random number; obtain the encoding scheme used to generate the random number; read the values in selected positions in the sequence of values derived from genetic information used to generate the random number; encode the values to pairs of bits using the encoding scheme used to generate the random number to generate a recreated random number; and use information based at least on the recreated random number to validate the random number.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Certain embodiments of the invention will now be described by way of example only, with reference to the accompanying figures, in which:

FIG. 3 shows a data representative of a sequence of nucleobases called from processing of the current data shown in FIG. 2 usable as a sequence of values derived from genetic information for use in generating random numbers in accordance with embodiments of the present disclosure;

FIG. 6A shows example code for use in implementing an example method as shown in FIG. 5 for seeding and using a pseudo Random Number Generator to select and encode values from the sequence of bases derived from genetic information shown in FIG. 3 to generating a random number;

FIG. 6B shows an output of the example code shown in FIG. 6A to produce sixteen random selections of positions in the sequence of bases derived from genetic information shown in FIG. 3 and for selecting an encoding scheme from the available schemes shown in FIG. 8;

FIG. 8 shows a table illustrating 16 of the available 24 encoding schemes for encoding nucleobases to pairs of bits;

FIG. 9 shows a table illustrating the sixteen bases randomly selected in FIG. 7 encoded using the encoding scheme selected as shown in FIG. 6B from the table shown in FIG. 8 into a random number represented by a 32 bit string in accordance with aspects of the present disclosure;

FIG. 10 shows an example message sending the generated random number responsive to the request for generating a random number in accordance with aspects of the present disclosure;

FIG. 11A shows example code for use in generating a hash of a random number for use in accordance with the random number generation method shown in FIG. 5 and the random number validation method shown in FIG. 12;

FIG. 11B shows an example output of a hashed recreated random number generated in accordance with the method shown in FIG. 12 and using the example code shown in FIG. 11A to validate the originally generated hashed random number.

DETAILED DESCRIPTION OF THE DRAWINGS

Figure 1:
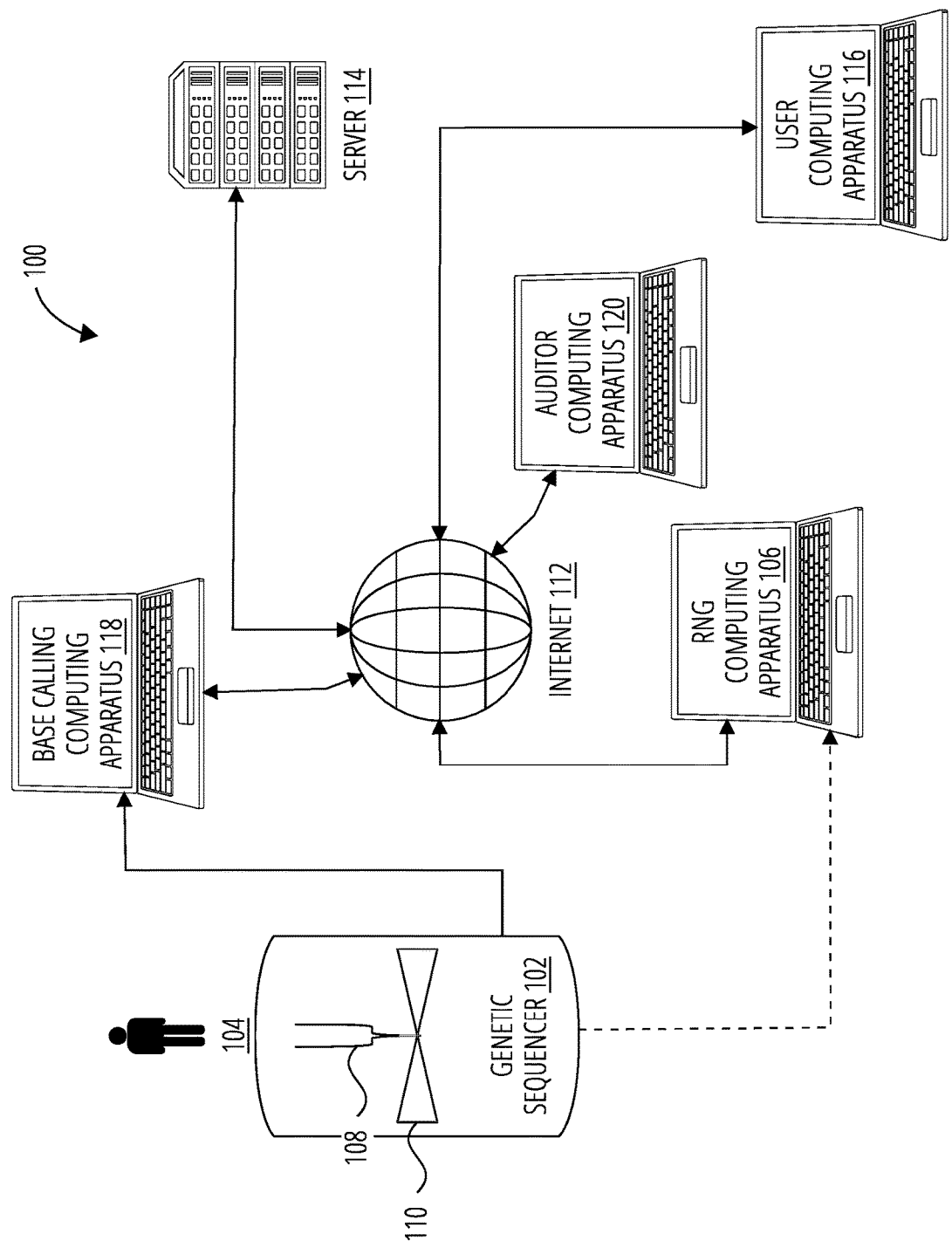
FIG. 1 shows an example system of apparatus including a genetic sequencer and an embodiment of a computing apparatus for generating a random number based on genetic information sequenced from a biological organism by the genetic sequencer in accordance with aspects of the present disclosure.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

FIG. 1 shows an example system 100 of connected apparatus for generating random numbers based on genetic information in accordance with aspects of the present disclosure.

The system 100 comprises a genetic sequencer 102 for extracting genetic information from a sample tube 108 containing polynucleotide strands from biological organism 104, in this case a human subject. That is, the sample tube 108 may contain a sample of the DNA or RNA of the biological organism 104 suitably prepared for sequencing by the genetic sequencer 102.

The genetic sequencer 102 provides output data including a genetic information contained in the sample tube 108 to a base calling computing apparatus 118 which is used to process the genetic information by 'base calling' to generate one or more sequenced bases. As can be seen in FIG. 1, alternatively or in addition, the genetic sequencer 102 provides output data including a genetic information contained in the sample tube 108 to a Random Number Generator computing apparatus 106 which may instead be used to process the genetic information by 'base calling' to generate one or more sequenced bases. As will be explained herein, the Random Number Generator computing apparatus 106 is used for generating a random number using a sequence of values derived from the genetic information.

In the embodiment, the example genetic sequencer 102 shown represents a third generation nanopore sequencer such as those available from Oxford Nanopore Technologies (https://nanoporetech.com/). However, the genetic information used in the Random Number Generator computing apparatus 106 for generating random numbers can come from any suitable source and is not limited to this sequencing technology and can use genetic information provided by second generation sequencers, and sequences of values derived from genetic information, such as sequences of bases from biological organisms, provided in any suitable form.

In the genetic sequencer 102 a transmembrane pore 110 (e.g. a nanopore) is used as an electrical biosensor for sensing genetic information in the form of the polynucleotides in a sequence in strands of DNA or RNA from the biological sample contained in the sample tube 108. Such transmembrane pores 110 can be used to identify small molecules or folded proteins and to monitor chemical or enzymatic reactions at approximately the single molecule level by means of sending the ion flow across the transmembrane pore 110, for example, as the strand of DNA/RNA passes through the pore. Interaction of an analyte with the transmembrane pore 110 can give rise to a characteristic change in ion flow (for example, a characteristic current profile) as the analyte translocates through the nanopore. That is, the ion flow (for example, electron flow/current) through a transmembrane pore 110 may be measured under a potential difference applied across the transmembrane pore 110.

Figure 2:
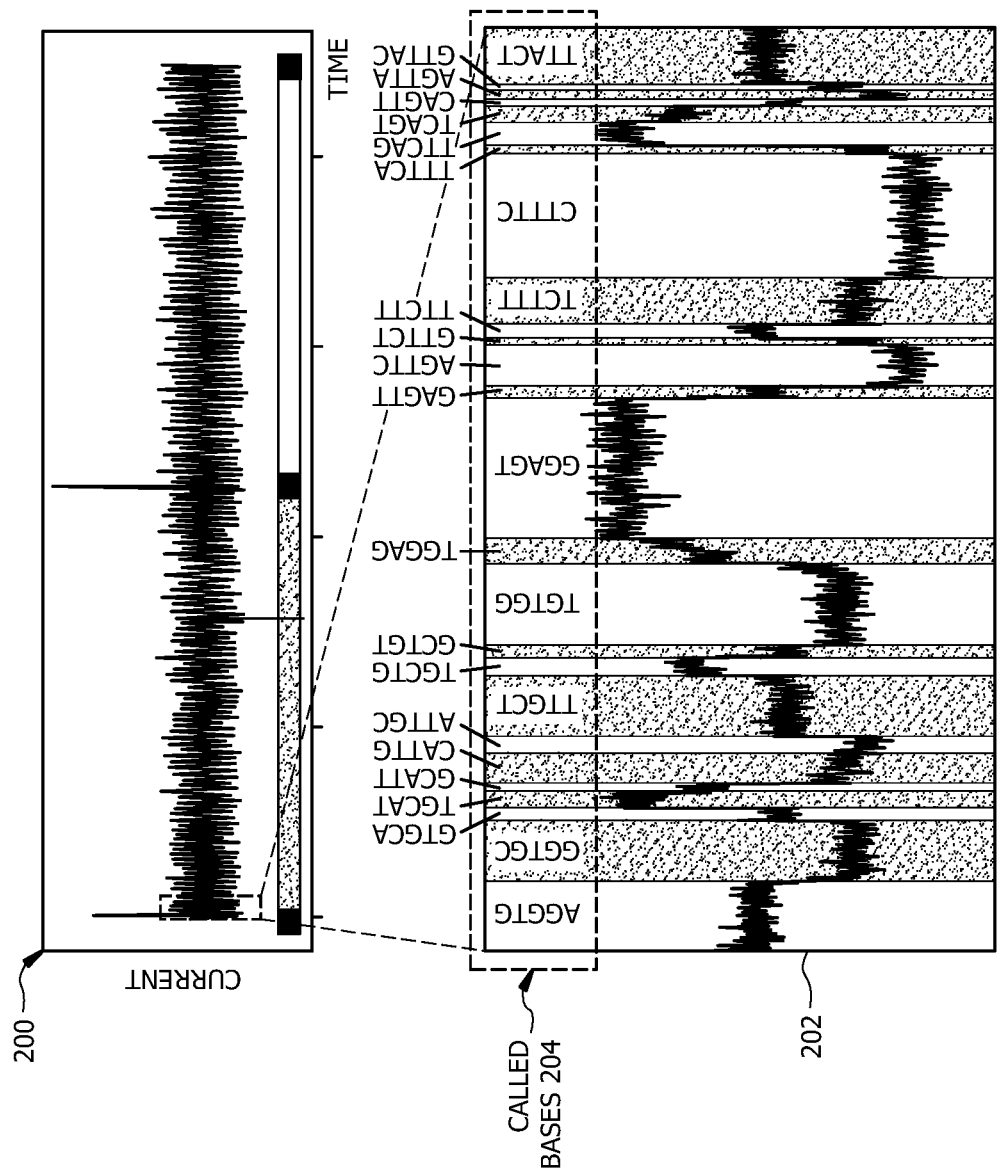
FIG. 2 shows a graph plotting current data output by the genetic sequencer shown in FIG. 1 over time, illustrating an example sequence of values derived from genetic information for use in generating random numbers in accordance with embodiments of the present disclosure.

A graph plotting an example of the raw data output 200 by the genetic sequencer 102 over time 208 is shown in the top of FIG. 2, with a detail 202 of part of the data shown underneath. As can be seen, the plot shows the raw data output 200 in the form of ion flow/current signal information, the form of which is characteristic of the analyte passing through the transmembrane pore 110.

FIG. 2 is credited to 1p, C.L.C., M. Tyson, J. R., de Cesare, M., Brown, B. L., Jain, M., et al. (2015). MinION Analysis and Reference Consortium: Phase 1 data release and analysis. F1000Research, 4. http://doi.org/10.12688/f1000research.7201.1.

For example, as a polynucleotide strand such as DNA passes through the transmembrane pore 110, the nucleobases of the DNA (i.e. adenine (A), cytosine (C), guanine (G), and thymine (T)) that pass through the transmembrane pore 110 produce a resultant characteristic current profile depending on which combination of 4-5 nucleobases as part of the DNA strand is passing through the sequencer at any given moment. As can be seen in the raw data output 200 in FIG. 2, this produces a current signal that falls to different levels that change as each base leaves the pore and a new base enters at the top. Interpretation of the changes in the current 206 can be decoded to infer the sequence of nucleobases on the DNA strand through a process of "base calling". The results of the base calling, giving a prediction of the called bases 204 for the different segments of the raw data, as shown overlaid above the detail 202 of a section of the raw data output 200 shown in the bottom pane of FIG. 2.

As can be seen, signal information produced by a genetic sequencer (a nanopore sequencer or otherwise) is typically very noisy due to, for example, electrical and environmental interference. In addition, the signal, as measured by the current 206 passing through the pore, reflects the presence in the pore of 4-5 nucleotides which are part of the DNA strand. Accordingly, the task of base calling to determine a polynucleotide sequence (i.e. determining a "read") from the signal information in the raw data output 200 is a computationally intensive task to complete, often requiring processing by artificial neural networks to analyse the raw data output 200. Thus, in order to determine the nucleobases in the raw data, the raw data output 200 needs to be processed by based calling using an often computationally intensive process, such as a deep neural network, to provide predictions of the nucleobases giving rise to the raw data.

Thus the raw data output 200 by the genetic sequencer 102 may be passed to a suitable computing apparatus for base calling, such as the base calling computing apparatus 118 (or the Random Number Generator computing apparatus 106 if this is also configured to perform base calling) to determine the sequence of nucleobases of the DNA/RNA molecules in the sample tube 108, and the resulting genetic sequence of bases may be stored in a server 114 accessible via the Internet 112, or otherwise passed directly to the Random Number Generator computing apparatus 106 for subsequent use in the generation of random numbers.

Once the DNA/RNA reads have been created through base calling, base calling computing apparatus 118 (or the Random Number Generator computing apparatus 106 if this is also configured to perform base calling) may store the read sequence of nucleobases in a suitable standard data structure, such as FASTS or other format such as that shown in the example of FIG. 3.

As shown in FIG. 3, the base called data 300 for a read includes a header 302 indicating an identifier (in the example, this is "@5d08ebdf-4b02-45bf-ac72-8e5716ca468d") and a run identifier (in this example "runid=3b55a2b916b3c56c641a45f4898b156692a08534") as well as further information concerning the sample, the read size, start time, etc. The base called reads are then stored in a payload showing the sequence of nucleobases 304 arranged in the example as pairs of adjacent sequenced bases, 16 pairs to a row, until the last, Nth, base pair is reached at the end of the read.

The base called data 300, representing the sequences of base values derived from genetic information, may be sent by the base calling computing apparatus 118 via the internet 112 to a server 114 which may store the base called data 300 for later retrieval, for example by the Random Number Generator computing apparatus 106. The base called data for all of the reads from the sample tube 108 may be sent by the base calling computing apparatus 118 to the server 114.

Alternatively, or in addition, the base calling computing apparatus 118 (or the Random Number Generator computing apparatus 106 if this is also configured to perform base calling) may pass the raw data output 200 by the genetic sequencer 102 on via the internet 112 to a server 114 which may store the raw data output 200 by the genetic sequencer 102 for later base calling processing by one or more other computing apparatuses. In this case, the base calling computing apparatus 118 or the Random Number Generator computing apparatus 106 may perform the base calling process at a later time. The base calling computing apparatus 118 may itself act as a server or the one or more servers 114.

At any time after the base calling computing apparatus 118 (or the Random Number Generator computing apparatus 106 if this is also configured to perform base calling) has received and processed the raw data output 200 from the genetic sequencer 102 and stored the raw data output 200 and/or the base called data 300 in server 114, the Random Number Generator computing apparatus 106 may receive a request for a random number. Alternatively, where the Random Number Generator computing apparatus 106 is configured to receive and process the raw data output 200 from the genetic sequencer 102, a request for a random number may be received by the Random Number Generator computing apparatus 106 contemporaneously with the reading out of the genetic sequencer 102 to the Random Number Generator computing apparatus 106, or the handling and base call processing of the raw data output 200 thereby.

Figure 4:
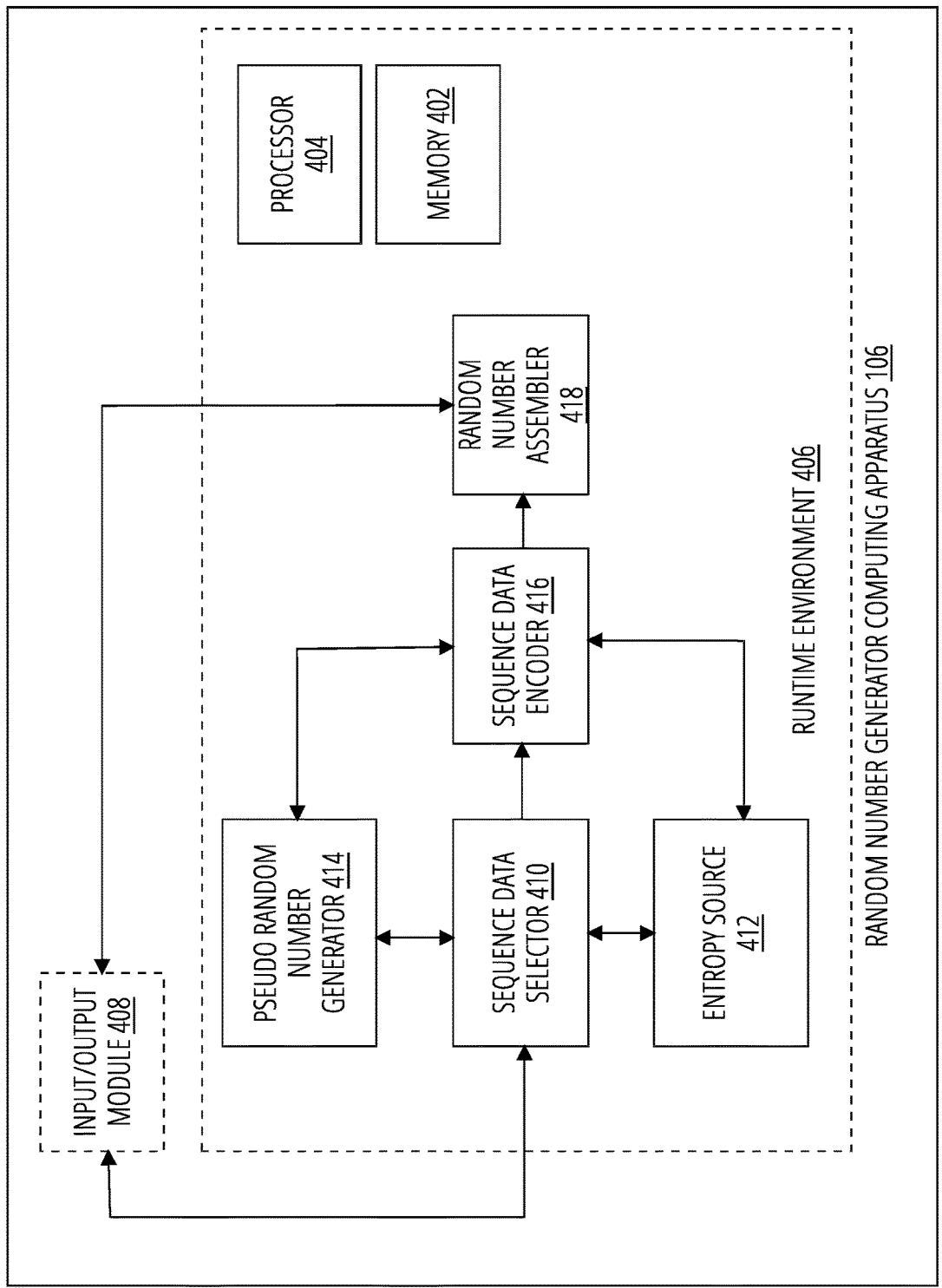
FIG. 4 shows a block diagram of the embodiment of the computing apparatus for use as a Random Number Generator shown in FIG. 1.
Figure 5:
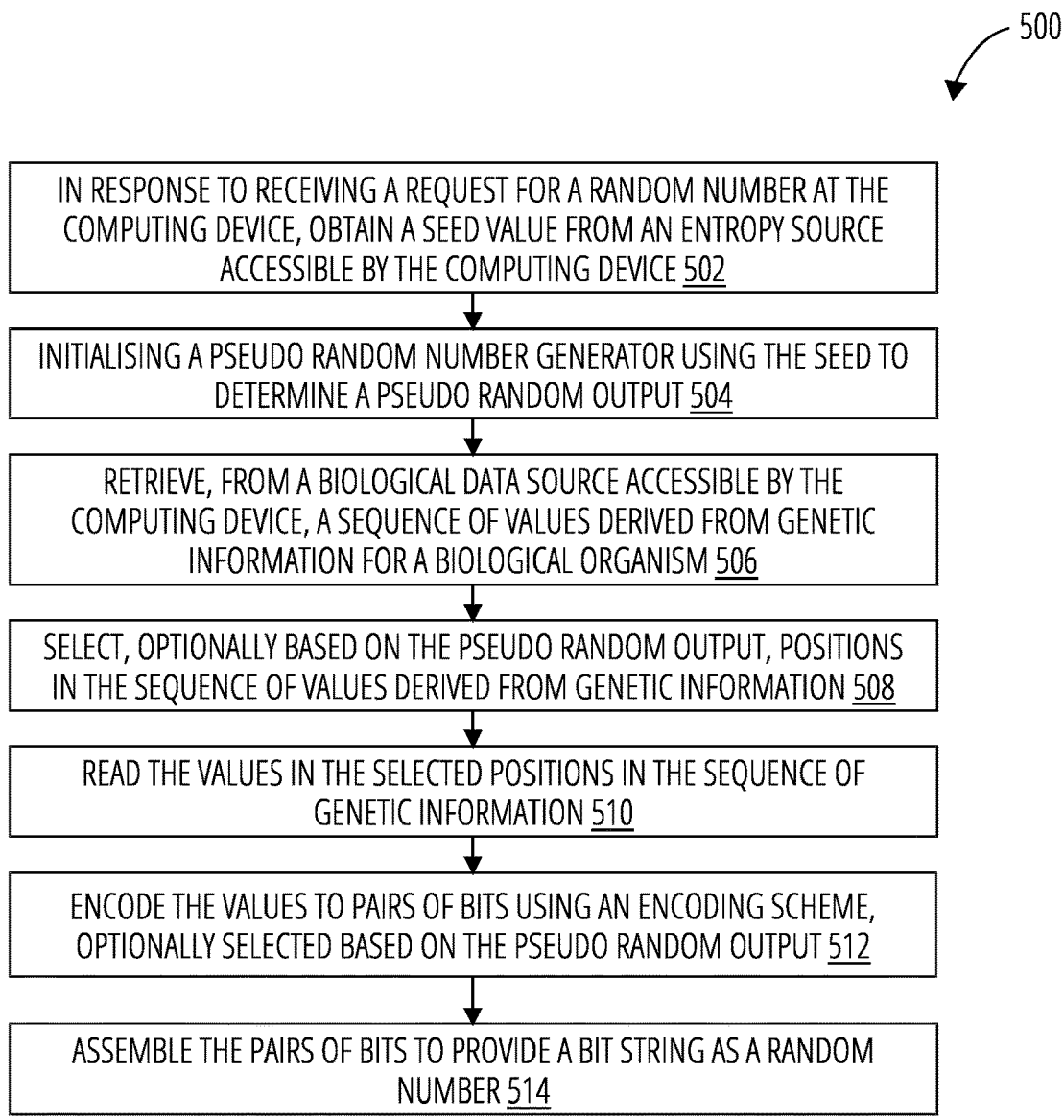
FIG. 5 shows an embodiment of a method for generating random numbers in accordance with aspects of the present invention, the method being implemented by the embodiment of the computing apparatus shown in FIG. 4.

Reference will now be made to FIG. 4 and FIG. 5 to describe how, responsive to the request for a random number, the Random Number Generator computing apparatus 106 generates a random number based on genetic information using the method 500.

FIG. 4 shows a block diagram of the embodiment of the computing apparatus for use as a Random Number Generator computing apparatus 106 shown in FIG. 1.

The Random Number Generator computing apparatus 106, comprises memory 402, one or more processors 404 and an input/output module 408. A bus system (not shown)

may be provided which supports communication between the at least one processor 404, memory 402 and input/output module 408.

The processor 404 executes instructions that can be loaded into memory 402. The processor 404 can include any suitable number(s) and type(s) of processors or other devices in any suitable arrangement. Example types of processor include microprocessors, microcontrollers, digital signal processors, field programmable gate arrays and application specific integrated circuits.

The memory 402 may be provided by any structure(s) capable of storing and facilitating retrieval of information (such as data, program code, and/or other suitable information on a temporary or permanent basis). The memory 402 can represent a random access memory or any other suitable volatile or non-volatile storage device(s). The memory 402 may also contain one or more components or devices supporting longer-term storage of data, such as a read only memory, hard drive, flash memory, or optical disc, which may store software code for loading into the memory 402 at runtime. In use, the processor 404 and memory 402 provide a runtime environment 406 in which instructions or code loaded into the memory 402 can be executed by the processor 404 to generate instances of software modules in the runtime environment 406.

The Random Number Generator computing apparatus 106 also comprises input/output module 408 providing a communications interface for receiving data via the internet 112, from one or more servers 114, user computing apparatus 116 and base calling computing apparatus 118, and, where a data connection to a genetic sequencer is provided, one or more of a genetic sequencer 102.

Although shown in FIG. 1 as a standalone computing apparatus, the Random Number Generator computing apparatus 106 may be configured as a networked server (which may be part of the one or more servers 114) or as a virtual machine implemented in a cloud computing service, any of which may be suitable for carrying out the random number generating and validations methods described herein.

With reference to FIG. 5, an embodiment of a method 500 for generating random numbers in accordance with aspects of the present invention will now be described, the method being implemented by the embodiment of the Random Number Generator computing apparatus 106 shown in FIG. 4. Reference will also be made throughout to FIG. 6A, FIG. 6B, FIG. 7, FIG. 8, FIG. 9 and FIG. 10 which provide examples illustrating the implementation of certain steps of the method 500 in Python code.

To implement the method 500, the memory 402 of the Random Number Generator computing apparatus 106 comprises instructions which, when executed by the one or more processors 404, cause one or more of the processors 404 to instantiate a sequence data selector 410, an entropy source 412, a pseudo random number generator 414, a sequence data encoder 416 and a random number assembler 418. Together, the sequence data selector 410, an entropy source 412, a pseudo random number generator 414, a sequence data encoder 416 and a random number assembler 418 may carry out the method 500 shown in FIG. 5 for generating random numbers based on genetic information from a biological data source containing at least the genetic information sequenced from a biological organism. Although the above functional elements for implementing the method 500 shown as modularised software, this is simply to facilitate understanding, and the specific implementation of the method 500 in the memory 402 of the Random Number Generator computing apparatus 106 may be achieved in any suitable way. Further, although the descriptions of the method 500 and method 1200 below describe the actions performed in the methods as steps, this is not intended to be in any way limiting, and it should be understood that the steps may be performed in an order different to that described below, or some of the steps may be performed in parallel.

In the method 500, in step 502, in response to receiving a request for a random number at the computing device, a seed value is obtained from an entropy source accessible by the computing device. The request for a random number may be received from a user computing apparatus 116 which, although presented as a standalone computing apparatus in FIG. 1, may be configured as a networked server or as a virtual machine implemented in a cloud computing service. The user computing apparatus 116 may request the provision of a truly random number for example for use in generating a cryptographic key for use in a cryptographic security protocol. The request for a random number may be received at the input/output module 408 via the internet 112, and it may be sent to the Random Number Generator computing apparatus 106 directly by the user computing apparatus 116, or it may be routed to the Random Number Generator computing apparatus 106 by a Random Number Generator service broker server, managing the providing random number generation as a service to plural user computing apparatus 116 on the internet 112.

The entropy source may be the entropy source 412 which may provide a seed value from an entropy source provided locally to Random Number Generator computing apparatus 106, or it may access an entropy source remote from the Random Number Generator computing apparatus 106, for example via the input/output module 408. In embodiments, the entropy source 412 accessible by the computing device may be the time of the computing device measured using a system clock of the computing device. The system clock may provide the time to a sub-microsecond resolution, or to an even higher resolution, such as to a nanosecond resolution.

The obtaining of the seed value is shown in FIG. 6A which shows example code 600 for use in implementing an example method as shown in FIG. 5 for seeding and using a pseudo Random Number Generator to select and encode values from the sequence of bases derived from genetic information shown in FIG. 3 to generating a random number. In particular, the following Python code 600 imports the time library and captures the values of the systems performance counter responsive to the receipt of the request for a random number in nanoseconds as an integer value suitable for use as a seed.

import time
time_ns=time.perf_counter_ns( )

The results of this step can be seen in the example code 602 shown in FIG. 6B, which shows that, in this instance, the seed was generated from the system time as an entropy source as follows:

Seed (performance counter)=32888750

Then, in step 504, the method 500 proceeds by initialising a pseudo random number generator using the seed to determine a pseudo random output. Here, the pseudo Random Number Generator 414, once initialized with the seed value, can be used to generate a series of random numbers. It should be noted that, when the same pseudo Random Number Generator is initialized with the same seed, it will always generate the same series of random numbers. In the example Python code shown in FIG. 6A, the random library is imported, and the pseudo random number generator 414 is initialized using the seed value generated from the system time as the entropy source 412 as follows:

import random
    random.seed(time_ns)

As shown in FIG. 4, the sequence data selector 410 may receive the request for a random number and then operate the entropy source 412 and the pseudo random number generator 414 to obtain the seed value and use it to initialize the pseudo random number generator 414. Alternatively, the entropy source 412 may be accessible or operatable directly by the pseudo random number generator 414 to obtain the seed value (and it may not be accessible or operatable by the sequence data selector 410 or sequence data encoder 416).

In step 506, the method 500 proceeds by retrieving, from a biological data source accessible by the computing device, which may be for example the server 114, a sequence of values derived from genetic information for a biological organism. The sequence data selectors 410 may access the biological data source to obtain the sequence of values derived from genetic information.

In the example described in detail herein, the sequence of values derived from genetic information for a biological organism used for generating the random number in the method 500 comprise sequenced bases of genetic information obtained from a genetic sequencer, such as the base called data 300 shown in FIG. 3. In this way, the output of, for example, a third generation genetic sequencer, processed by a "base calling" method to sequence nucleobases in the DNA or RNA in the sample from the biological organism, can be used to generate truly random numbers. The sequences used for generating the random numbers may be retrieved from a store, or they may be used as they are generated in real time by a genetic sequencer or output by a subsequent "base calling" process.

Alternatively, or in addition, the sequence of values derived from genetic information for a biological organism used for generating the random number in the method 500 may comprise a raw data output from a genetic sequencer, such as the raw data output 200 shown in FIG. 2. For this purpose, the raw data output 200 received from the genetic sequencer, in the form of periodically sampled current levels (for example sampled when the current flow passes below a threshold level, corresponding to an analyte passing through the transmembrane pore 110) can itself provide such a sequence of values derived from genetic information for use in generating random numbers. In other approaches, the raw data output 200 of noisy varying current levels may be used.

In the illustrative example described herein, in relation to the FIG. 6A to FIG. 11B operate on the base called data 300 shown in FIG. 3 as it has been base called in the Random Number Generator computing apparatus 106 to generate a random number. In embodiments however, the retrieving of a sequence of values derived from genetic information for use in generating a random number may comprise selecting the sequence of values derived from genetic information at random from a plurality of available sequences of values derived from genetic information retrievable from the biological data source. That is, the selection of the base called data 300, may be a random selection from among a large number of different sequences of values derived from genetic information available to the Random Number Generator computing apparatus 106 either in the data stream obtained from the genetic sequencer 102, or from the base calling processing, or from a biological data source datastore on server 114. The available different sequences of values derived from genetic information may be from different reads of the same polynucleotide sequence, or from different polynucleotide sequences from the same or different biological organisms. The random selection of a sequence of values derived from genetic information from an abundance of available genetic information further facilitates the generation of truly random numbers. The random selection of the sequence of values derived from genetic information may be based on a pseudo random output of the pseudo random number generator 414.

In embodiments, after retrieving the sequence of genetic information from the biological data source and using the sequence in generating a random number, the sequence of genetic information may be not used again to generate another, different random number. That is, in an example, once the base called data 300 has been used to generate a random number, it may not be used again. By using each sequence only once, and avoiding their re-use, the unpredictability of the random number generated by the method is further enhanced. This may be achieved by a simple flag being marked in a field in the biological data source indicating that a particular sequence has already been used to generate a random number, with the method including selecting the sequence only from among those that have not already been used to generate a random number.

In step 508, the method 500 proceeds by the sequence data selector 410 selecting positions in the sequence of values derived from genetic information. In examples, where the selection of the encoding scheme is based on the pseudo random output, and/or wherein the selection of the sequence of values derived from genetic information is based on the pseudo random output, the selection of the positions in the sequence of values derived from genetic information need not be random. That is, consecutive values in the sequence of values derived from genetic information starting at a predefined position may be selected. For example, if 16 base values are needed to generate a 32 bit random number, the first bases 0-15 may be selected from the base called data 300 if the base called data 300 has itself been randomly selected, and/or if the encoding scheme is to be randomly selected. Alternatively a fixed pattern of positions may be used.

Alternatively, to further enhance the unpredictability of the random number generation, the selection of the positions in the sequence of values derived from genetic information may be based on the pseudo random output. This may occur where the selection of the encoding scheme may or may not also be random and based on the pseudo random output, and/or wherein the selection of the sequence of values derived from genetic information may or may not also be random and based on the pseudo random output.

In examples, the selection of the positions may follow a predefined pattern, or a randomly selected one of a set of possible predefined patterns, and the predefined pattern may start at a randomly selected position in the sequence of values derived from genetic information based on a pseudo random output from pseudo random number generator 414.

Figure 7:
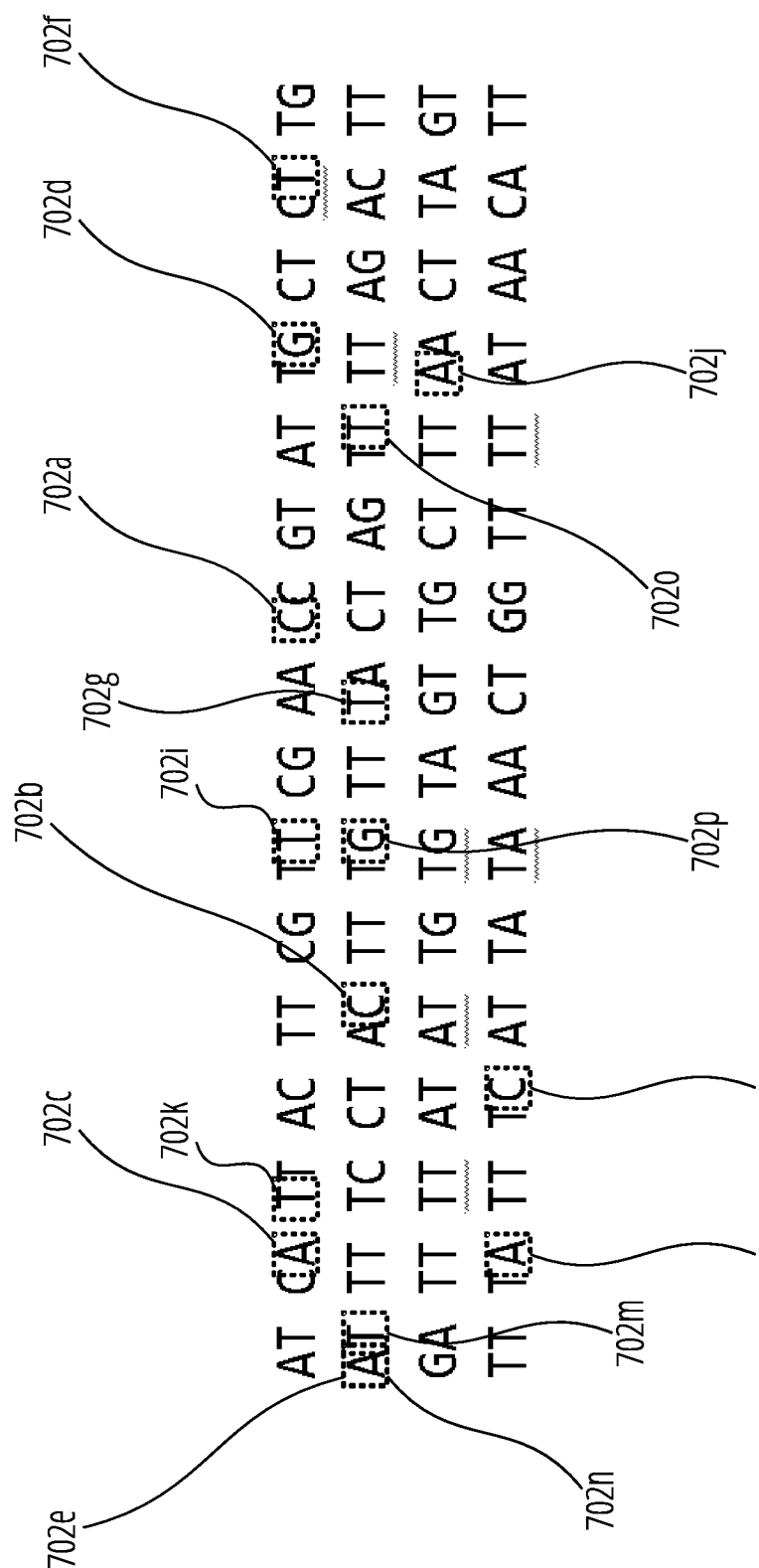
FIG. 7 shows the selection of bases from the data shown in FIG. 3 using the generated random selections of positions shown in FIG. 6B for use in generating a random number in accordance with aspects of the present disclosure.

In other examples, and as will be seen in relation to FIG. 7, the selection of positions may be individually randomised, with each position selection being based on a different pseudo random output from the pseudo random number generator 414.

In the example shown in relation to FIG. 6A, FIG. 6B and FIG. 7, to generate a 32 bit truly random number, sixteen random positions are randomly selected by a series of sixteen different pseudo random outputs from the initialized pseudo random number generator 414 within a range of 0 to a maximum base number (which may, for example, be up to the length of the sequence data, or be selected from a smaller number of bases, for example 128 bases), each random position representing a selection of a single base value in the base called data 300.

As shown in FIG. 6A, after the pseudo random number generator 414 is initialized with the seed value, sixteen pseudo random outputs numbering between 0 and the length of the sequence are generated from the pseudo random number generator 414 using the following code:

int(random.uniform(0, max_base_number))

The function random.uniform returns a random number which is guaranteed to be from a uniform distribution within a specified range. As can be seen in FIG. 6B, the sixteen example base positions randomly selected by the pseudo random number generator 414 initialized with the seed value 32888750 and set to select up to a max_base_number of 127 are as follows:

Base selection 1=18
Base selection 2=41
Base selection 3=3
Base selection 4=25
Base selection 5=32
Base selection 6=30
Base selection 7=48
Base selection 8=103
Base selection 9=13
Base selection 10=89
Base selection 11=4
Base selection 12=99
Base selection 13=33
Base selection 14=32
Base selection 15=55
Base selection 16=45

It should be noted that these sixteen values will always be output by the pseudo random number generator 414 following initialisation with the seed value 32888750.

In step 510, the method 500 proceeds with reading the base values in the selected positions in the sequence of genetic information. That is, however the positions are selected, the values in the sequence of values derived from genetic information are read. In the example shown in FIG. 7, the following sixteen bases 1-16 are read from the base called data 300 using the sixteen base positions randomly selected by the pseudo random number generator 414 as shown in FIG. 6B:

702a: Base 1 (read from random base selection position 18)=C
702b: Base 2 (read from random base selection position 41)=C
702c: Base 3 (read from random base selection position 3)=A
702d: Base 4 (read from random base selection position 25)=G
702e: Base 5 (read from random base selection position 32)=A
702f: Base 6 (read from random base selection position 30)=T
702g: Base 7 (read from random base selection position 48)=T
702h: Base 8 (read from random base selection position 103)=C
702i: Base 9 (read from random base selection position 13)=T
702j: Base 10 (read from random base selection position 89)=A
702k: Base 11 (read from random base selection position 4)=T 702l: Base 12 (read from random base selection position 99)=A
702m: Base 13 (read from random base selection position 33)=T
702n: Base 14 (read from random base selection position 32)=A
702o: Base 15 (read from random base selection position 55)=T
702p: Base 16 (read from random base selection position 45)=G This is shown in FIG. 9 which shows the summary table for the generation of the random number in the example, in which the sixteen base reads 902 are as follows:

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| C | C | A | G | A | T | T | C | T | A  | T  | A  | T  | A  | T  | G  |

In step 512, the method 500 proceeds by encoding the read values to pairs of bits using an encoding scheme. In the Random Number Generator computing apparatus 106, the read values from the genetic information are passed to sequence data encoder 416 to be encoded using an encoding scheme. In embodiments, the selection of the encoding scheme may be based on a pseudo random output from the pseudo random number generator 414. A single, randomly selected encoding scheme may be used to encode all of the selected bases in the read, or a different encoding scheme may be randomly selected to encode each base, or groups of bases, in the read.

The selection of the encoding scheme may be controlled by the sequence data encoder 416, by operation of the pseudo random number generator 414. The sequence data encoder 416 may simply use the pseudo random number generator 414 as it has been used previously for the generation of random numbers for the selection of the positions in the sequence of values derived from genetic information, or it may re-seed the pseudo random number generator 414 with a different seed value obtained from the entropy source 412. The random selection of the encoding scheme may not be needed where the selection of the positions to be read in the sequence of values derived from genetic information is based on pseudo random outputs of the pseudo random number generator 414, or where the selection of the sequence of values derived from genetic information is random. However, selecting the encoding scheme based on a pseudo random output of the pseudo random number generator 414 may further enhance the unpredictability of the generated truly random number.

In the example, as there are four values of nucleobases (A, C, G, T) that need to be encoded, these can be mapped to four 2-bit values, with a number of different encoding schemes being available based on the permutations of the four bases and four pairs of bits.

FIG. 8 shows a table 800 illustrating only the first 16 of the available 24 encoding schemes for encoding nucleobases to pairs of bits, these are numbered 0-23.

In the example shown in FIG. 6A, a further pseudo random output is obtained from the pseudo random number generator 414 (continuing with its previous configuration, without first re-seeding it) to provide a random number between 0-23 which is used to select the encoding scheme to be used to generate the random number. The following code is used to generate the encoder selection random number:

int(random.uniform(0, 24))

As can be seen in FIG. 6B, in the example, the pseudo random number generator 414 generated the coding scheme selection number as =11. As can be seen from the table 800 in FIG. 8, and the summary table in FIG. 9, the randomly selected encoding scheme 11 904 maps bases to pairs of bits as follows:

| A: 11 | C: 01 | G: 10 | T: 00 |
|---|---|---|---|

Thus in the example, in step 512, the encoding of each of the sixteen bases 1-16 using the encoding scheme 11 provides the following mapping of encoded bases 906:

| C | C | A | G | A | T | T | C | T | A | T | A | T | A | T | G |
|---|---|---|---|---|---|---|---|---|---|---|---|---|---|---|---|
| 01 | 01 | 11 | 10 | 11 | 00 | 00 | 01 | 00 | 11 | 00 | 11 | 00 | 11 | 00 | 10 |

Once the read values are encoded, in step 514, the method 500 proceeds to assemble the encoded pairs of bits to provide a bit string as a random number. As shown in FIG. 9, in the example, the assembled 32-bit random bit string 908 is 01011110110000010011001100110010.

The size of the random bit string can be adapted arbitrarily by simply selecting a larger number of values from the sequence of values derived from genetic information and encoding them as above. Generally, the larger the number of values to be selected, the selection should be taken from a larger sequence of values derived from genetic information. In the example shown above, 16 bases are used to generate a 32-bit truly random number. A selection of 32 bases can be used to generate a 64-bit truly random number.

In embodiments, the sequence of values derived from genetic information may be kept secret and not revealed to the requester of the random number or a requestor to validate the generation of the random number. In this way, although the genetic information used to generate the random number may be kept secret in order to maintain privacy, it can still be used to generate a truly random number, and to validate the generation of the truly random number.

In embodiments, once a sequence of values derived from genetic information has been used to generate a random number, it may not be used again. This can retain the unpredictability of the random numbers generated. That is, if the same sequence of values derived from genetic information was used repeatedly to generate random numbers, the result may become less unpredictable. This may be achieved by a simple flag being marked in a field in the biological data source indicating that a particular sequence has already been used to generate a random number, with the method including selecting the sequence only from among those that have not already been used to generate a random number.

Thus, in accordance with the method 500, the combination of the obtaining of a seed value from an entropy source accessible by the Random Number Generator computing apparatus 106, in response to receiving a request for a random number, and the selecting of random positions from a new and previously unused sequence of values derived from genetic information randomly selected from the biological data source may ensure that the random number cannot be known or predicted in advance of the request for a random number being received.

In embodiments, the method may further comprise sending the random number responsive to the received request. The random number may be sent towards the user computing apparatus 116 via the internet 112.

In the example, a message structure such as that shown in FIG. 10 is used. This includes the identifier (in the example, "@5d08ebdf-4b02-45bf-ac72-8e5716ca468d") extracted from the header 302 of the base called data 300 that provided the sequence of values derived from genetic information from which the random number was generated, the original seed value used to seed the pseudo random number generator 414, the positions in the base called data 300 randomly selected by the pseudo random number generator 414, the encoding scheme randomly selected by the pseudo random number generator 414, and the random number itself.

The message includes at least the random number encoded using the encoding scheme, or a random number output based on the random number. For example, the method may further include hashing the random number with further data. Such further data may include one or more of: the original seed value used to seed the pseudo random number generator 414; a further seed value obtained from the entropy source accessible by the computing device (to add further entropy to the output); an identifier of the request for a random number at the computing device; a hash of the request for a random number at the computing device; the method further comprising sending the hash responsive to the received request.

An example of Python code 1100 for use in generating a hash of the generated random number is shown in FIG. 11A. Here the Python hashlib library is imported and the hashed random number output is defined using the SHA256 hashing algorithm as follows:

import hashlib
   m=hashlib.sha256( )

The hash is then updated by first hashing the random number encoded using the encoding scheme, and then by hashing it together with the seed value used to seed the pseudo random number generator 414, or with the request identifier for the random number, or some other user-specified source of entropy, using the following code:

m.update("00110010000111110111111110011100".encode('utf-8'))
   m.update("32888750".encode('utf-8'))

In this way, the 32-bit random number encoded using the encoding scheme is hashed together with the seed value, and optionally a user-supplied entropy source, to produce a 256-bit random number output, which is similarly truly random and unpredictable as an output. In the example, as a hexadecimal digest of the 256-bit random number output by the SHA256 algorithm is shown in the example code 1102 of FIG. 11B as "2809d5d03 d1ff393 ef3851182d9e4fe93017c6242327d3682ee48888b4aca7c9".

The message by the Random Number Generator computing apparatus 106 sent to the user may include the original random number or the hashed random number output or both.

The hashing of the truly random numbers together with some of the information used in the generation of that random number allows the generated hash to also be truly random and unpredictable, while also hiding the original random number produced from the genetic information. This can further help retain the secret nature of the genetic information selected from to produce the random number, and it can also be useful in verifying the random number after it has been produced, building further evidence that the random number has been generated using the method.

After the random number is generated, to allow its verification, in embodiments, the method may further comprise storing at least one of the following items of information used to generate the random number, for later use in verifying the generation of the random number: the original seed value used to seed the pseudo random number generator 414 in the generation of the random number; the sequence of genetic information used to generate the random number; an indication of the encoding scheme used to generate the random number; the random number; optionally, any additional information hashed together with the random number; the hashed random number output.

The data may be stored using a data format similar to that shown in FIG. 10, and it may be stored locally to the Random Number Generator computing apparatus 106, and/or remotely at other computing apparatus or one or more servers such as server 114 which may be configured to provide a verification service for verifying the generated random numbers. The information may be stored in a data store accessible to the computing apparatus used to generate the random number, and also a user computing apparatus that receives the generated random number and wishes to validate it. At least some of the above items of information may also be sent to the receiver of the random number (or a random hash produced therefrom), to allow the user computing apparatus to use some of that information to validate the random number as having been generated by the truly random number generation process. At least some of the above items of information may also or instead be sent to a third party auditor computing apparatus 120 (see FIG. 1) to allow the third party computing apparatus to audit the generated the random number by validating that it has been generated by the above-described process.

Thus only information needs to be stored that is sufficient to enable later validation of the random number. This verification may include performing at least some of the steps of the method 500 in order to recreate the random number to verify that it corresponds to the random number originally generated using the method 500.

Figure 12:
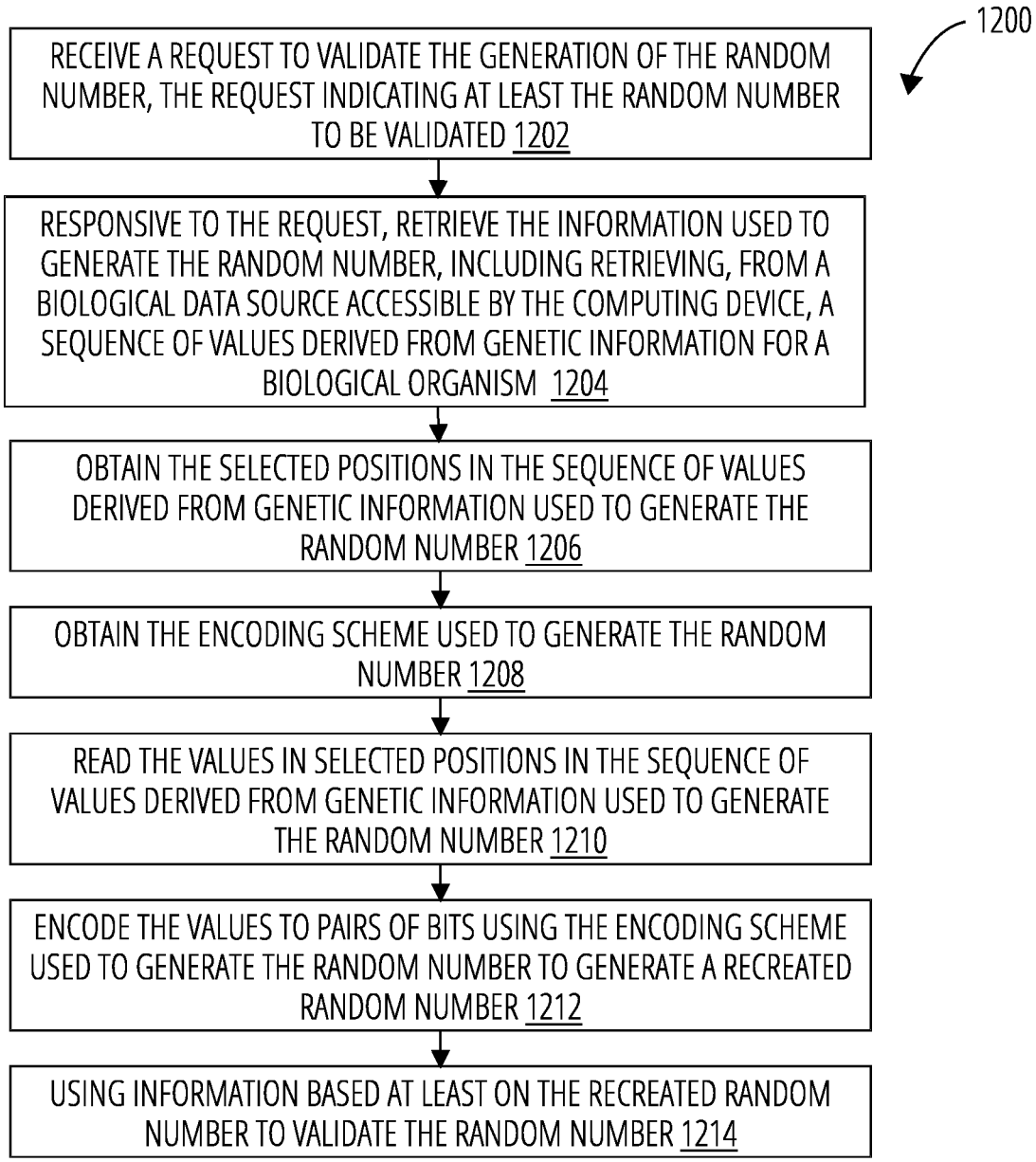
FIG. 12 shows an embodiment of a method for validating random numbers in accordance with aspects of the present disclosure.

Reference will now be made to FIG. 12 which shows an embodiment of a method 1200 for validating random numbers in accordance with aspects of the present disclosure. The method 1200 may be performed by Random Number Generator computing apparatus 106, server 114, auditor computing apparatus 120, or any other suitable computing apparatus having access to the appropriate information needed to verify that the number was generated in accordance with the method 500 using a sequence of values derived from genetic information. For simplicity, in the following description, the method 500 will be described as if it were being carried out by Random Number Generator computing apparatus 106. As such, the method 1200 may be implemented in runtime environment 406 by instructions stored in memory 402.

In step 1202, method 1200 receives a request to validate the generation of the random number, the request indicating at least the random number to be validated. The request may be received by the Random Number Generator computing apparatus 106 from the user computing apparatus 116 that requested the random number at any time after the random number has been generated, or from a third party auditor computing apparatus 120 attempting to validate the generated random number (for example, on behalf of user computing apparatuses). The indication of the random number to be validated received with the request is the minimum information that is sufficient to allow verification, provided sufficient information allowing an audit of how the number was generated is accessible to the computing apparatus performing the verification, for example, so as to permit at least some of the steps to be performed to recreate the random number.

In step 1204, method 1200 responsive to the request, the information used to generate the random number is retrieved. Retrieving the information used to generate the random number may comprise retrieving at least some of the information from a data store at a location accessible by the computing apparatus performing the validation (whether that is the Random Number Generator computing apparatus 106, auditor computing apparatus 120, or any other computer apparatus performing the validation), the information having been stored at the location responsive to the generation of the random number. Retrieving the information used to generate the random number may also comprise retrieving at least some of the information from the received request to validate the generation of the random number. Thus, the validating computing apparatus (that is, the Random Number Generator computing apparatus 106, auditor computing apparatus 120, or any other computer apparatus performing the validation) may retrieve the information sufficient to perform the validation from the validation request (which may include some useful information) and from a data store in which the information was originally stored responsive to the generation of the random number. This may include retrieving, from a biological data source accessible by the computing device, the sequence of values derived from genetic information for a biological organism from which the original random number was generated.

In step 1206, method 1200 obtains the selected positions in the sequence of values derived from genetic information used to generate the random number. If the selected positions 702a-702h are available to the computing apparatus performing the validation (whether that is the Random Number Generator computing apparatus 106, auditor computing apparatus 120, or any other computer apparatus performing the validation), from the data store, or from the validation request, then the values can simply be read out of the retrieved sequence of values derived from genetic information. On the other hand, the selected positions 702a-702p may be re-created by use of the pseudo random number generator 414. That is, obtaining the selected positions in the sequence of values derived from genetic information used to generate the random number may include reinitialising the pseudo random number generator 414 with the original seed value to generate a pseudo random output, and then, selecting, based on the pseudo random output, positions in the sequence of values derived from genetic information used to generate the random number.

In step 1208, method 1200 obtains the encoding scheme used to generate the random number. Similarly, if the selected encoding scheme 904 is available to the computing apparatus performing the validation (whether that is the Random Number Generator computing apparatus 106, auditor computing apparatus 120, or any other computer apparatus performing the validation), from the data store, or from the validation request, then that can simply be used to encode the values read out of the sequence of values derived from genetic information. On the other hand, the selected encoding scheme 904 may be re-created by use of the pseudo random number generator 414. That is, obtaining the selected encoding scheme 904 used to generate the random number may include reinitialising the pseudo random number generator 414 with the original seed value to generate a pseudo random output, and then, selecting, based on the pseudo random output, the encoding scheme from among the available encoding schemes.

In step 1210, method 1200 reads the values in selected positions (in the example, 702a-702p) in the sequence of values derived from genetic information used to generate the random number.

In step 1212, method 1200 encodes the values to pairs of bits using the encoding scheme used to generate the random number (in the example, the selected encoding scheme 904) to generate a recreated random number. If the original random number was generated correctly using the method 500, then the recreated random number should match the original random number.

Thus, in step 1214, method 1200 the original random number is validated using information based at least on the recreated random number. This may be achieved by comparing the original and recreated random numbers, and it may include re-sending the requestor of the validation a recreated message including the recreated random number (or an appropriate hash thereof) so that the requestor can validate the recreated random number/re-sent message by checking it for correspondence against the original random number/originally sent message data.

Thus Random Number Generator computing apparatus 106 or alone or in combination with one or more other such computing devices may be arranged as a server to provide verifiable truly random numbers as a service to any user computing apparatus 116 or server requesting a random number over the internet 112.

It has been found that, by processing sequences of values derived from genetic information, such as nucleobases obtained by sequencing a deoxyribonucleic acid, DNA, sequence or a ribonucleic acid, RNA, sequence obtained from a biological organism using a genetic sequencer, in accordance with the methods described herein, unpredictable and truly random numbers can be generated, exploiting the randomness seen in DNA and RNA sequences. In particular, the use of the output of pseudo Random Number Generator seeded with a seed value obtained in response to receiving a request for a random number, which takes a value uncontrollable in advance, to select a set of randomised positions in the sequence of values derived from genetic information, which itself represents a physical source of inherently random and unpredictable values, combine to generate an unpredictable and truly random number output.

The seeding of the pseudo Random Number Generator with a time of a system clock of a computing apparatus, to high resolution, allows the pseudo random output used for selecting values from the sequence of values derived from genetic information to be unpredictable in advance of the request for a random number being received. In this way, the unpredictable and random selection of values from the unpredictable and random genetic information ensures that the generated random number is truly random and unpredictable in advance of the number being generated.

The methods have been demonstrated to pass a large number of Random Number Test Suites, including the NIST SP800-22 Test Suite, the Dieharder Test Suite, the TestU01 Small Crush Test Suite, the TestU01 Alphabit Test Suite, and the TestU01 Rabbit Test Suite. Given the volume of genetic information available from genetic sequencers, with the advent of third generation sequencing technologies enabling the rise in full genome sequencing that will deliver personalised medicine, the methods described herein can provide as a byproduct a potentially limitless source of true random numbers that are easy to produce and maintain, without requiring careful hardware validation or a controlled environment to maintain statistical unpredictability.

Further, as the genetic information used to generate the random numbers is easily retained, after the generation of each random number, the process of generating that random number can be audited and verified by a process in which the random number can be recreated by processing the genetic information in the same way to recreate the original random number. In this way, although the random number that is produced by the methods described herein is unpredictable in advance, after it has been generated it can be easily verified that has indeed been generated by a truly random number generation method. This can increase the security and integrity of the systems that rely on the method for producing random numbers for cryptographic purposes.

Further still, as the genetic information used to generate the random numbers is generated at speed by a genetic sequencer or by post processing to generate the reads, and can be retained in volume in a biological data store, the methods described herein can be used to quickly generate truly random numbers in large volumes of arbitrary sizes.

Further, although the genetic information produced from a biological organism may need to be handled secretly (and indeed, keeping the genetic information secret at least in advance of the generation of the random number can further enhance its unpredictability), it can be used both as a source of physical randomness for use in producing truly random numbers, and for securely verifying the generation of the random numbers afterwards, without needing to compromise the secret nature of the genetic information.

Thus, appropriately processed, genetic information can provide an effectively limitless verifiable source of easily produced, reliably truly random numbers. Further, the use of genetic information as a physical source of randomness provides a further valuable technical use of this information, with the methods described herein allowing that value to be controlled and its use technically exploited for cryptographic purposes, the sharing of which can further incentivise the provision of biological organism samples for sequencing, accelerating the development and deployment of personalised medicines and other scientific and therapeutic benefits delivered by capturing genetic information.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

In the preceding detailed description, many of the processing tasks described have concerned the conversion of signal information representative of a polynucleotide sequence into a base sequence. However, the skilled person would appreciate that the methods and apparatuses described herein are applicable to other types of signal information. For example, signal information may relate to other native molecules such as proteins or secondary modifications. As another example, signal information may relate to modified or synthetic molecules such as oligonucleotide tags, analogs of nucleic acids, or expandomers including expandable nucleoside triphosphate.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A computer-implemented method of generating a random number based on genetic data from a biological data source comprising at least a genetic information sequenced from a biological organism, the method comprising, by a computing apparatus:

in response to receiving a request for the random number at a computing device, obtaining a seed value from an entropy source accessible by the computing device;

initialising a pseudo random number generator using the seed value to determine a pseudo random output;

retrieving, from the biological data source accessible by the computing device, a sequence of values derived from the genetic information from the biological organism;

selecting a set of randomized individual positions in the sequence of values derived from the genetic information, the set of randomized individual positions based on the pseudo random output;

reading the values in the selected positions in the sequence of values derived from the genetic information;

---

SEQUENCE LISTING

```
Sequence total quantity: 4
SEQ ID NO: 1            moltype = DNA  length = 256
FEATURE                 Location/Qualifiers
source                  1..256
                        mol_type = other DNA
                        organism = synthetic construct
misc_feature            1..256
                        note = Strawb_leaf data
SEQUENCE: 1
atcattactt cgttcgaacc gtattgctct tgattttcct actttgttta ctagttttag   60
acttgatttt atattgtgta gttgctttaa cttagtttta tttcattata aactggtttt  120
ataacatttg ataatagatt acgctttgag gtttttatgg ctagaggcgt gccttaagca  180
ctctcaggcg gcgcctgggc tcagggtcgc cctggcctag gtgcgcctag ggccttttaa  240
tcataatgag tatttt                                                  256

SEQ ID NO: 2            moltype = DNA  length = 32
FEATURE                 Location/Qualifiers
source                  1..32
                        mol_type = other DNA
                        organism = synthetic construct
misc_feature            1..32
                        note = Strawb_leaf data
SEQUENCE: 2
atagaataag attattcttt caaggcaatt cc                                 32

SEQ ID NO: 3            moltype = DNA  length = 128
FEATURE                 Location/Qualifiers
source                  1..128
                        mol_type = other DNA
                        organism = synthetic construct
misc_feature            1..128
                        note = Selection of bases from the data
SEQUENCE: 3
atcattactt cgttcgaacc gtattgctct tgattttcct actttgttta ctagttttag   60
acttgatttt atattgtgta gttgctttaa cttagtttta tttcattata aactggtttt  120
ataacatt                                                           128

SEQ ID NO: 4            moltype = DNA  length = 16
FEATURE                 Location/Qualifiers
source                  1..16
                        mol_type = other DNA
                        organism = synthetic construct
misc_feature            1..16
                        note = Sixteen base read
SEQUENCE: 4
ccagattcta tatatg                                                   16
``` encoding the values to pairs of bits using an encoding scheme; and assembling the pairs of bits to provide a bit string as the random number, wherein the random number is operable to be validated from the seed.

2. The computer-implemented method of claim 1, further comprising sending the random number responsive to the received request.

3. The computer-implemented method of claim 1, further comprising hashing the random number with one or more of:

the seed value used to seed the pseudo random number generator;

a further seed value obtained from the entropy source accessible by the computing device;

an identifier of the request for the random number at the computing device;

a user-supplied source of entropy;

a hash of the request for the random number at the computing device;

the method further comprising sending the hash responsive to the received request.

4. The computer-implemented method of claim 1, wherein the entropy source accessible by the computing device is a time of the computing device measured using a system clock of the computing device to a sub-microsecond resolution.

5. The computer-implemented method of claim 1, wherein retrieving, from the biological data source accessible by the computing device, the sequence of values derived from the genetic information from the biological organism comprises selecting the sequence of values derived from the genetic information at random from a plurality of available sequences of the genetic data retrieved from the biological data source.

6. The computer-implemented method of claim 5, wherein after retrieving the sequence of values derived from the genetic information from the biological organism and assembling the pairs of bits to provide a bit string as the random number, the sequence of values derived from the genetic information is not used again to generate another, different random number.

7. The computer-implemented method of claim 5, wherein the sequence of values derived from the genetic information from the biological organism comprises sequenced bases of the genetic information obtained from a sequencing device, and wherein the read values are bases read from selected base positions in the sequence of the genetic information, the encoding scheme encoding bases to bit pairs.

8. The computer-implemented method of claim 7, wherein the encoding bases to bit pairs comprises randomly selecting the encoding scheme from an available set of encoding schemes mapping bases to pairs of bits, the random selection being based on an output of the pseudo random number generator.

9. The computer-implemented method of claim 5, further comprising storing:

an original seed value used to seed the pseudo random number generator in a generation of the random number;

the sequence of the genetic information used to generate the random number;

an indication of the encoding scheme used to generate the random number;

the random number; and any additional information hashed together with the random number, the storing enabling later validation of the random number and the method used to generate the random number.

10. The computer-implemented method of claim 1, further comprising:

receiving a request to validate a generation of the random number, the request indicating at least the random number to be validated;

responsive to the request, retrieving information used to generate the random number;

reinitialising the pseudo random number generator with the seed value to generate the pseudo random output;

selecting, based on the pseudo random output, the positions in the sequence of values derived from the genetic information used to generate the random number;

reading the values in selected positions in the sequence of values derived from the genetic information used to generate the random number;

encoding the values to pairs of bits using the encoding scheme used to generate the random number to generate a recreated random number;

validating the random number based on the recreated random number and the request to validate the generation of the random number.

11. The computer-implemented method of claim 1, wherein the combination of the obtaining of the seed value from an entropy source accessible by the computing device, in response to receiving a request for the random number, and the selecting of the positions in the sequence of values derived from the genetic information ensures that the random number cannot be known or predicted in advance of the request for the random number being received.

12. The computer-implemented method of claim 1, wherein the sequence of values derived from the genetic information is kept secret and not revealed to the requester of the random number or a requestor to validate a generation of the random number.

13. The computer-implemented method of claim 1, wherein the biological data source comprises a store of biological data stored in a memory of one or more servers, or wherein the biological data source comprises a stream of biological data generated by a genetic sequencer as it is processing the genetic information sequenced from the biological organism.

14. The computer-implemented method of claim 1, further comprising:

receiving a request to validate a generation of the random number, the request indicating at least the random number to be validated;

responsive to the request, retrieving the information used to generate the random number, including the retrieving, from the biological data source accessible by the computing device, the sequence of values derived from the genetic information from the biological organism;

obtaining the selected positions in the sequence of values derived from the genetic information used to generate the random number;

obtaining the encoding scheme used to generate the random number;

reading the values in the selected positions in the sequence of values derived from the genetic information used to generate the random number;

encoding the values to pairs of bits using the encoding scheme used to generate the random number to generate a recreated random number; and using information based at least on the recreated random number to validate the random number.

15. The computer-implemented method of claim 14, wherein retrieving the information used to generate the random number comprises at least one of:
retrieving at least some of the information from a data store at a location accessible by the computing apparatus, the information having been stored at the location responsive to the generation of the random number; and
retrieving at least some of the information from the received request to validate the generation of the random number.

16. The computer-implemented method of claim 14, wherein obtaining the selected positions in the sequence of values derived from the genetic information used to generate the random number comprises:
reinitialising the pseudo random number generator with the seed value to generate the pseudo random output; and
selecting, based on the pseudo random output, the positions in the sequence of values derived from the genetic information used to generate the random number.

17. The computer-implemented method of claim 14, wherein obtaining the encoding scheme used to generate the random number comprises:
reinitialising the pseudo random number generator with the seed value to generate the pseudo random output;
selecting, based on the pseudo random output, the encoding scheme used to generate the random number.

18. A computing apparatus comprising:
one or more processors; and
a memory storing instructions that, when executed by one or more of the processors, configure the apparatus to:
in response to receiving a request for a random number at the computing apparatus, obtain a seed value from an entropy source accessible by the computing apparatus;
initialize a pseudo random number generator using the seed to determine a pseudo random output;
retrieve, from a biological data source accessible by the computing apparatus, a sequence of values derived from genetic information from a biological organism;
select a set of randomized individual positions in the sequence of values derived from the genetic information, the set of randomized individual positions based on the pseudo random output;
read the values in the selected positions in the sequence of values derived from the genetic information;
encode the values to pairs of bits using an encoding scheme; and
assemble the pairs of bits to provide a bit string as the random number,
wherein the random number is operable to be validated from the seed.

19. The computing apparatus of claim 18, further comprising a non-transitory computer-readable storage medium, the computer-readable storage medium including instructions that when executed by the one or more processors, cause the one or more of the processors to:
in response to receiving a request for the random number at the computing device, obtain the seed value from an entropy source accessible by the computing device;
initialize the pseudo random number generator using the seed to determine the pseudo random output;
retrieve, from the biological data source accessible by the computing device, the sequence of values derived from the genetic information for the biological organism;
select positions in the sequence of values derived from the genetic information;
read the values in the selected positions in the sequence of values derived from the genetic information;
encode the values to pairs of bits using the encoding scheme; and
assemble the pairs of bits to provide the bit string as the random number.

20. A non-transitory computer-readable storage medium, the computer-readable storage medium including instructions that when executed by one or more processors of a computing apparatus, cause one or more of the processors to:
in response to receiving a request for a random number at the computing device, obtain a seed value from an entropy source accessible by the computing device;
initialize a pseudo random number generator using the seed value to determine a pseudo random output;
retrieve, from a biological data source accessible by the computing device, a sequence of values derived from genetic information from a biological organism;
select a set of randomized individual positions in the sequence of values derived from the genetic information, the set of randomized individual positions based on the pseudo random output;
read the values in the selected positions in the sequence of values derived from the genetic information;
encode the values to pairs of bits using an encoding scheme; and
assemble the pairs of bits to provide a bit string as the random number,
wherein the random number is operable to be validated from the seed.

* * * * *